Figure 8:
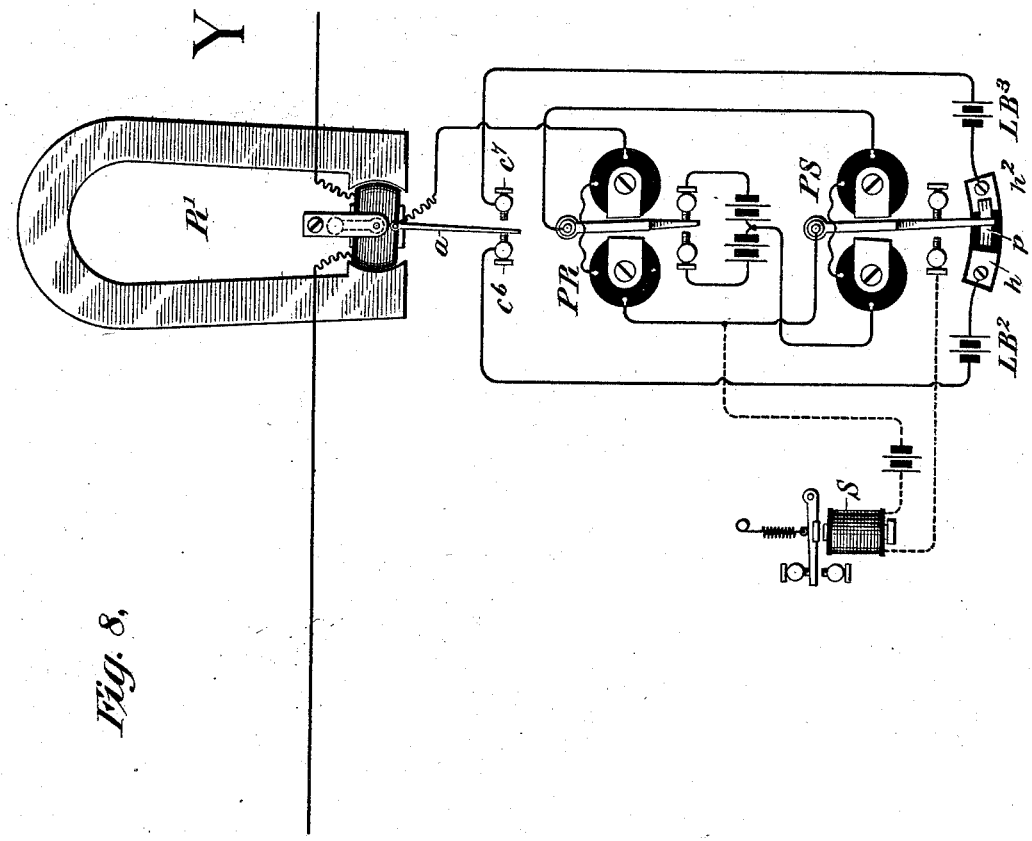

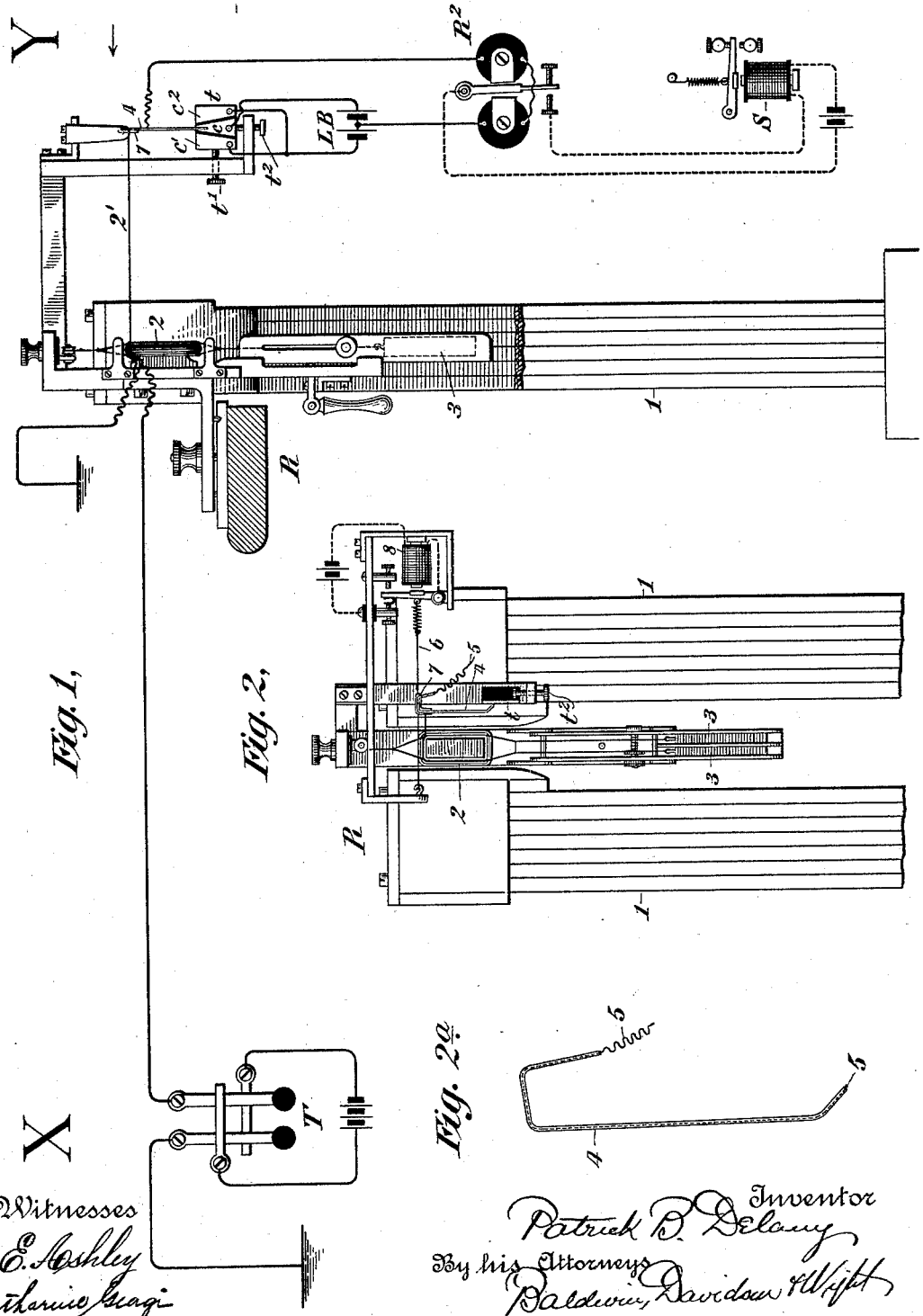

(No Model.) 4 Sheets—Sheet 2.
P. B. DELANY.
TELEGRAPHY.
No. 510,005. Patented Dec. 5, 1893.
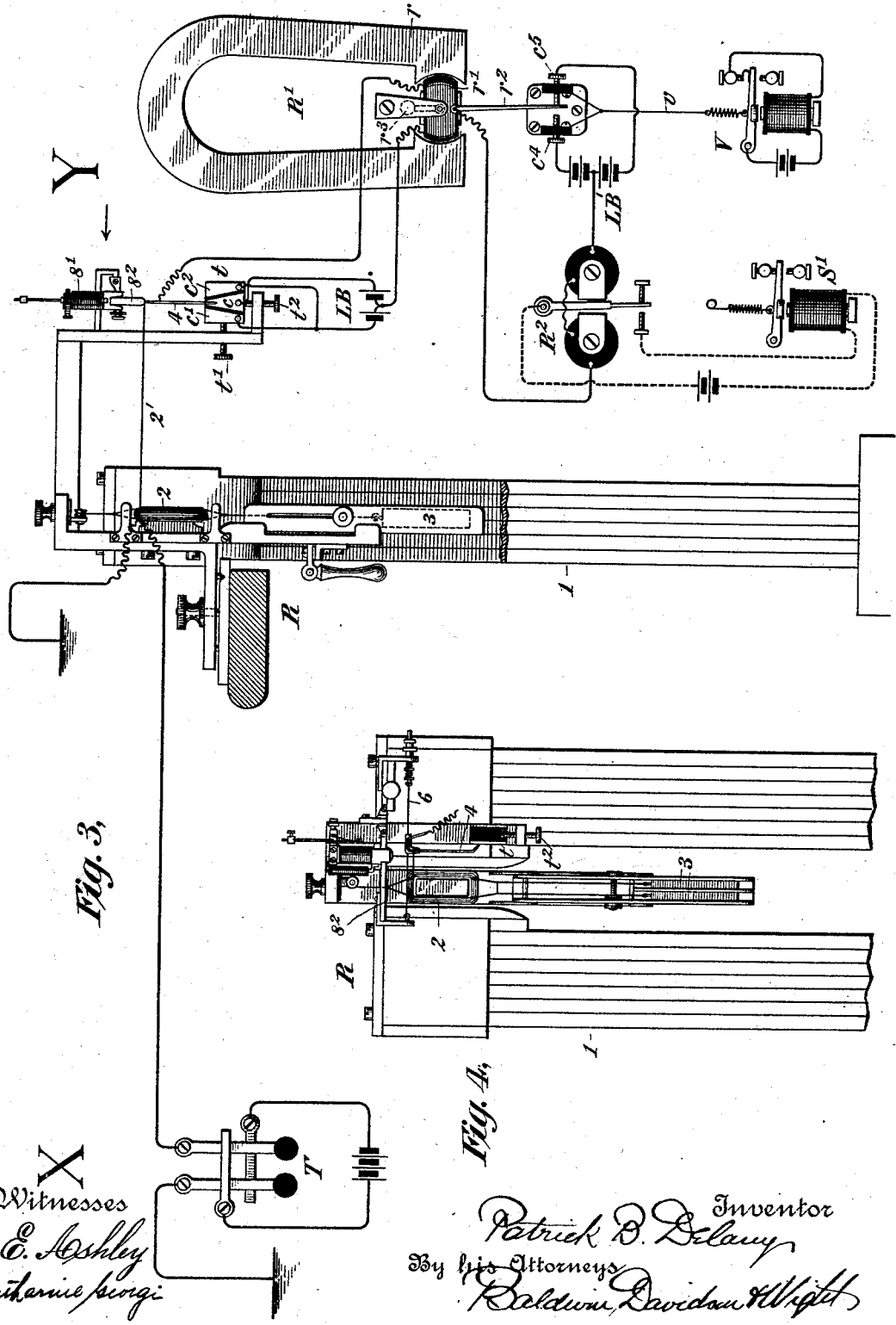

(No Model.) 4 Sheets—Sheet 3.
P. B. DELANY.
TELEGRAPHY.
No. 510,005. Patented Dec. 5, 1893.
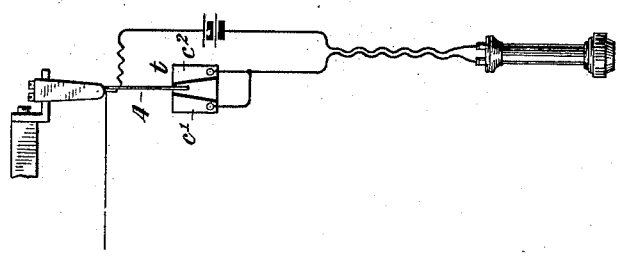
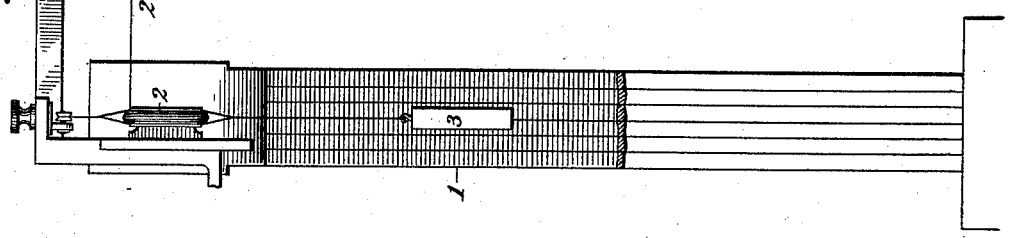
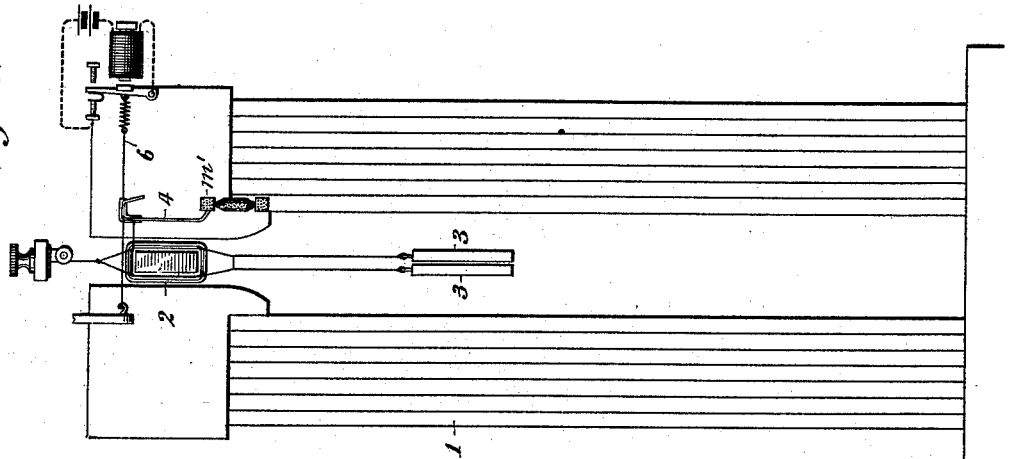

(No Model.)  4 Sheets—Sheet 4.

P. B. DELANY.
TELEGRAPHY.

No. 510,005. Patented Dec. 5, 1893.

Witnesses
C. E. Ashley
Catharine George

Inventor
Patrick B. Delany
By his Attorneys
Baldwin, Davidson & Wight

UNITED STATES PATENT OFFICE.

PATRICK B. DELANY, OF SOUTH ORANGE, NEW JERSEY.

TELEGRAPHY.

SPECIFICATION forming part of Letters Patent No. 510,005, dated December 5, 1893.

Application filed April 14, 1893. Serial No. 470,272. (No model.)

*To all whom it may concern:*

Be it known that I, PATRICK B. DELANY, a citizen of the United States, residing in South Orange, New Jersey, have invented certain new and useful Improvements in Telegraphy, of which the following is a specification.

My invention is designed more especially for the operation of telegraph circuits of high resistance and electro-static capacity, such as long submarine or underground cables, where experience has proven that regularly alternating currents affect the receiver more definitely than successive currents of the same polarity, and that the fewer the impulses sent over the cable, the more definiteness each signal will have at the receiving end. Usually signals are received over such circuits by Thomson recorders, and in some instances by reflecting galvanometer receivers. In both of these systems, reverse currents are used, but not regularly alternating in polarity, dashes being represented by currents of one polarity and dots by currents of opposite polarity, so that in transmitting the letter B, for instance, an impulse of one polarity representing the dash would be followed by three impulses of the opposite polarity representing the three dots. Now while the change from one polarity to the other actuates the receiver to a marked degree, the three successive impulses of like polarity have scarcely any effect upon it, beyond holding it in about the same swerved position to which the first of the three dots, or the reversal, carried it. Hence it is, to a large extent, that translation of signals from the paper strip of the recorder is made by judging the number of dots represented, from the length of the composite mark, rather than by definitions or defined lines for each dot. It has been found impossible to employ with long cables receiving relays in the regular Morse way, for the reason that the slight fall of potential between dots of like polarity is entirely inadequate to actuate a receiving relay. More success has attended relay working by the use of regularly alternating impulses, with special devices for securing uniformity of duration, such as shown in my various patents; but in these systems, and all others, so far as I am aware, marking and spacing currents have been necessary—that is, a single dot, for instance, requires two currents, one to begin the dot, the other to end it. Therefore relay working requires twice the number of impulses required by the Thomson recorder or the mirror, for the same number of signals or letters. With the recorder, one impulse makes a bend in the ink line below the normal straight line or plane, denoting one signal, while a reversal carries the line above the horizontal plane, denoting another signal. Heretofore with a relay receiver, one current has been necessary to attract the armature or movable part in one direction, and a reverse current required to restore it to its original position or actuate it in the opposite direction, for it has not been feasible with the old arrangements to work neutral relays over such circuits. Owing, therefore, to the large number of reversals necessary to make the signals, the speed has been correspondingly limited, and the impulses have lacked force and emphasis, for it is well known among cable electricians that if reversals of high frequency are sent into a cable, the receiver will be unaffected. My invention is designed to overcome these difficulties and make relay working over cables entirely practicable at a comparatively high rate of speed. This result is reached by the adoption of several leading principles, viz: the use of regularly alternating impulses, the utilization of each impulse as a signal, and the maintenance of the movable part of the receiver in a normally central or zero position, susceptible to actuation in either direction according to the polarity of the current, and an arrangement of local contacts for the movable part of the receiver so that while it is in its normal position with no current on the line, the sounder or final receiver is open, and when the movable part of the receiver is actuated to either side of this central position by a current of either polarity, the sounder is operated. Preferably, however, I employ a polarized relay or instrument between the main and final receiver and arrange and connect the local contacts against which the movable part of the main receiver works, so that while said part is in its normal central or zero position with no current on the line, one side of a local split battery is closed through an intermediate polarized instrument that actuates the final receiver the latter instrument being in the open or spacing position, and when the movable part of the main receiver is actuated to either side of its normal position by a current of either polarity, it connects the other side of the split battery through the intermediate instrument, reversing it, and causing the final receiver to manifest the received dot or dash as the case may be.

By the use of two keys for transmission, such as are used in the present recorder system, and (unlike the present method of transmission) by regularly alternating from one key to the other, Morse signals may be produced on the receiver in a perfectly reliable manner.

The main receiving instrument herein illustrated bears strong resemblance to and has some features in common with the receiver shown in my Patent No. 425,597, dated April 15, 1890, but it is different notwithstanding in several important particulars, which will be readily apparent from the drawings and following description, and the system of operation herein described differs essentially from that described in the patent.

Instead of attaching the contact arm directly to the coil of the receiver, it may be mounted as the siphon of the Thomson recorder is now mounted, and similarly controlled by the motion of the coil through the medium of a fine fiber. The contact maker controlled by the movable part of the receiver is also of novel design, as I may make use of a small glass tube, such as is used for siphons in the Thomson recorder, through which is drawn a very fine wire, the end of which protrudes slightly beyond the end of the siphon tube, the whole being secured at both ends, in any desirable way, and, for instance, by wax or other sticky compound or a setting fluid may be drawn into the tube which will hold the wire rigid throughout. In this way the vibrating arm or tube will not require any different means of adjustment than those now used for the ordinary siphon, while the very fine wire will be protected, held in place and supported by the tube. At the leading in end the fine wire may be coiled and so disposed that it will offer no more resistance to the movement of the tube than is experienced in the use of ink in a well in which the end of a siphon has to move. I consider this supporting and protecting of a fine connecting wire by a stable support or sustainer capable of high rate vibration an important feature of my invention, as it renders my general receiver, up to this point, quite as sensitive as the Thomson recorder, and it only remains to insure reliable local contact between the vibrating wire and the contacts in its path to operate the local intermediate relay controlling the sounder, ink writer, repeater, or such other final receiver as may be used.

Another useful feature of my invention is the adjustability of the local contacts in any direction, and the tapering shape of the center contact piece or space so that in case of unsteadiness or disturbance from earth current, or from imperfect balance in duplex working or from other causes, the contacts may be so arranged in relation to the contact arm that its scope of disturbance will not extend to the reversing contact on either side; and by such a lateral adjustment, the operator will be able to quickly follow up any biasing of the contact arm caused by waves of earth currents or otherwise.

Another important feature of my invention is comprised in an arrangement for preventing sticking or adherence of the movable contact arm of the main receiver or relay to its contacts from any cause whatever. I have discovered that by communicating fine vibrations to the limiting stops or contacts of a sensitive receiver or to the mounting of the movable part itself, all liability to stick is overcome. The vibrations should be in a plane lengthwise of the contact arm, or in other words, parallel with the face of contact, so that there will be no tendency to jar the arm laterally. With a polarized or unbiased relay in the circuit of these local contacts, the effect of fine vibrations is to insure prompt action, as the rubbing effect under pressure exerted by the main line contact causes quick and certain actuation. When the main line current ceases, the vibration prevents any welding or other bond of cohesion between the contacts, allowing the movable arm to respond promptly to the earliest influence of a reverse impulse coming over the line. These freeing vibrations may be created in any suitable way electrical, mechanical, or otherwise, and of course, may be applied to a receiver in a main line circuit, a local circuit, or to the contact or limits of any delicately actuated arm for measuring, indicating or signaling purposes.

When vibrations are applied to the frame or bearings of the movable part of a receiver, its sensitiveness is greatly increased owing to decrease of friction.

The accompanying drawings are diagrammatic views illustrating my improvements in several forms.

Figure 1 shows an organization in which cable recorder mechanism modified according to my invention is included in the main line, and controls, through suitable contacts, a relay that operates the receiver proper. Fig. 2 is a view of a portion of the receiver apparatus looking in the direction of the arrow; Fig. 2ª a detailed view showing an ordinary glass siphon such as is used in cable recorders, with a wire drawn into it. Fig. 3 shows an organization of apparatus similar to Fig. 1, with an intermediate relay and some other modifications in vibrating contacts to prevent sticking. Fig. 4 is a view of a part of the receiver apparatus shown in Fig. 3, looking in the direction of the arrow. Figs. 5, 6 and 7 illustrate an adaptation of my invention in which a telephone is employed as the final receiver, and Fig. 8 shows an organization for preventing the welding or sticking between the contacts of delicate receivers.

In the several figures, X represents the transmitting end of the line, and Y the receiving end.

Referring specially to Figs. 1, 2 and 2ª, the transmitter T is of the well known character used in cable telegraphy, having two ordinary pole changing keys. The receiver R is like the ordinary cable recorder now in general use except as hereinafter specified, and consists of the field magnet 1, a movable coil or part 2 located in the field thereof, and centered by weights 3, and a contact arm or vibrator 4, corresponding with the ordinary siphon of recorders, and operated from the movable coil 2 by a fine fiber 2' as is well understood. A contact arm, however, is shown in this instance, consisting of an ordinary glass recorder siphon, having drawn into it a wire 5. The projecting end of this wire or a suitable tip applied thereto, plays upon a contact table $t$ on which are contacts whose faces lie in the plane of movement of the contact arm. In addition to the adjustability back and forth of the arm or piece upon which it is mounted this table may be adjusted longitudinally or transversely with reference to the contact arm, by screws $t'$ and $t^2$. The center contact $c$ is connected to one pole of the local split battery L B and the two outer contacts $c'$ $c^2$ are connected to the other pole. The upper end of the wire 5, leading out of the glass tube, is coiled and connected to a polarized relay $R^2$, and from this relay, the circuit is connected to the middle of the local battery. The relay $R^2$ controls the local circuit of the final receiver S, which may be of any type of sounder or recorder or both and may serve as a repeater working into another circuit. The bar or wire 6 upon which the contact arm or vibrator is mounted, is strained between a point on the frame and the armature lever of a magnet 8 mounted on a bracket. This magnet is included in a local circuit and is provided with automatic circuit breaking devices. By its action a longitudinal intermittent or vibratory strain is communicated to the wire or bar. The movable member or contact arm 4 may be differently constructed, that is to say, the desired lightness and rigidity may be attained by any other suitable construction though I prefer that shown. It will be observed that the central contact $c$ is wedge-shaped and that the inner edges of the contacts $c'$ $c^2$ are parallel therewith. By this construction I am enabled by adjusting the table of contacts to adapt it to any bias which the contact arm may receive from earth currents, or other causes, and I may also adjust the table of contacts to correspond with the extent of lateral swinging of the contact arm, which may at times vary because of the varying static capacity of the circuit or from other causes. In this organization as well as in other figures, I have not thought it necessary to further describe or illustrate the ordinary construction of the Thomson recorder cable receiver. I may say, however, that the arm 4 which corresponds with the siphon in the recorder is to be operated precisely as the siphon is in the well known recorder instrument. The operation of this adaptation of my invention is as follows:

The main line circuit is from earth at the transmitting end to one of the keys, through top cross-bar of the transmitter to the other key (both keys being normally up), thence to the receiver and through the movable coil thereof to earth, and there is no current from the transmitter battery on the line. The apparatus is so adjusted that at this time the contact point of the movable arm 4 rests centrally upon the middle contact $c$. If now one key be depressed, a current of one polarity traverses the line, the coil 2 of the receiver is swung in one direction, moving the contact arm by means of the fiber 2, upon either the contact $c'$ or $c^2$, thus reversing the circuit of the polarized relay $R^2$, and closing the local circuit of the final receiver S. When the key is raised, the transmitting battery is withdrawn from the line, the contact arm resumes its normal central position, the polarized relay is reversed and the signal completed. For the next signal the other transmitting key is depressed, a current of opposite polarity traverses the line, and the operation is repeated. The automatic action of the electro-magnet 8 imparts vibrations to the contact arm 4 not only preventing welding, friction or sticking between its contact point and the contacts $c$, $c'$, $c^2$, but by reason of such vibrations insuring a minute rubbing action between the contact faces which improves the electrical contact.

In Figs. 3 and 4 I have shown an organization similar to that above described with the exceptions hereinafter noted. The circuit of the local battery is connected as before described except that its circuit is completed through a pivoted or swinging coil of an intermediate relay R' (preferably unbiased) and controlled and adjusted for sensitiveness to a degree equal to or approximating that of the main receiver, so that it may be actuated by very weak local currents and respond quickly to the completions of its local circuit at contacts at $c'$, $c^2$ of the main receiver. This intermediate relay R' might be substantially a duplicate of the recorder R. It is shown in the drawings as consisting of a field magnet $r$ in the field of which the coil $r'$ is pivoted. The coil carries a contact arm $r^2$ counterbalanced by weight $r^3$. The adjustable contacts $c^4$, $c^5$ of this relay are connected with opposite poles of the local battery L B', the center of which is connected through the coils of a second intermediate polarized relay $R^2$, and thence to the contact arm $r^2$. The relay $R^2$ controls the local circuit of a final receiver or repeater S'. In order to prevent the welding or sticking between $r^2$ and the contact stops $c^4$, $c^5$ I connect the posts in which the two latter contacts are mounted, or the base which supports them, with the armature lever of an automatic vibrator V by a strain wire $v$. The operation is the same as that already described in connection with Fig. 1. In these figures the longitudinal vibrations imparted to the contact arm 4 are set up by the vibration of the armature lever of a magnet $8'$ mounted upon the bridge or yoke $8^2$ between the ends of which the wire or bar 6 is strained. This particular construction is that ordinarily used for imparting similar vibrations to the ink siphon of the ordinary cable recorder. In the drawings Figs. 3 and 4 show a well known form of cable recorder mechanism except with the modifications and additions above described which commence at the contact arm 4. The operation of the apparatus in these figures is as follows:

The line connections and transmitter are as before described. The armature of the local polarized relay $R^2$ at the receiving end is on its open or spacing side, and the circuit of the sounder $S'$ is open. Now if the left hand key at X be pressed down a positive impulse will be sent which will swing the coil of the main receiver R and its contact arm 4, say to the right. The vibrating contact arm 4, making automatically, by reason of the vibrations imparted thereto, fifty or more contacts per second with $c^2$ will reverse the local current through the intermediate relay $R'$, causing its armature to move to its left hand contact and reverse the circuit of polarized relay $R^2$ which will in turn close the sounder circuit. If a dot is sent from X the vibrating contact arm 4 will remain on the right hand contact $c$, but a short time, quickly returning to its zero or central contact $c$, again reversing the intermediate relay $R'$ and throwing the armature lever of the polarized relay $R^2$ to the open side. If a dash be sent, the key is held down for a length of time corresponding to a dash. The contact arm in this instance will remain on its side contact $c^2$ until the dash is completed. Now, when it is desired to transmit letter A, represented by a dot and a dash, the left hand key at X is pressed down and quickly released, and the receiver responds in the manner described. Then the right hand key is pressed down for a time representing a dash, and the receiver arm is carried to the other side against the contact $c'$ and the intermediate and polarized relays $R'$, $R^2$ are affected the same as in the case of the dot, except for a time representing a dash, or as long as the key is held down at X. Thus dots or dashes may be made on either key according to the order in which they come. The keys are operated alternately and each impulse produces a complete signal, which as already stated would in all other cable relay systems require two impulses. In transmitting letter H, comprising four dots, four impulses of regularly alternating polarity would be used, and each key would be used in regular alternation, and it would make no difference which key the first dot was sent from, it only being necessary to avoid using the same key twice in succession. In transmitting to ordinary recorders one key must be used for dashes and the other for dots, rendering regular alternation of impulses impracticable. It will be seen that the zero position of the coil and contact arm of R is brought about by the weights 3, and this zero position is utilized to represent the open or spacing current on the local polarized relay. An impulse of either polarity or direction coming over the main circuit will represent the closing or marking current on the final receiver $S'$. It will be understood that in operating long cables condensers are interposed in the main line circuit, so that a dash does not form a continuous current, but the receiver owing to the slowness with which the impulse comes out, will remain biased for a sufficient time to represent a dash. It returns to its zero or central position quickly only when the key is raised and the cable put to earth at the sending end, or when a reversed current is sent into the cable.

In my invention the local instrument controlled by the main line instrument may be an ordinary Thomson recorder whose local circuit is controlled at the table of contacts.

Fig. 8 represents a new way of overcoming the detrimental welding or sticking between the contact arms of delicate receivers, and their local contact plates or points, by breaking the local circuit by local means after the local contact has been made by the movable part of the receiver. In this figure $R'$ may represent a receiver in the main line. For instance, it may represent receiver R in Figs. 1 and 3, or it may represent a relay, as $R'$, in Fig. 3. In a former application I have shown and described a means of accomplishing this important result by separable contacts, the local contacts being moved away from the movable arm of the receiver while the latter is arrested by limiting stops. In the present organization, the object is accomplished without moving the local contacts. The figure shows a relay or receiver $R'$ which may be directly operated by main line currents or locally controlled by a main line receiver. Assuming that the last impulse placed the arm $a$ of receiver $R'$ against its left hand contact $c^6$ it resulted in placing the polarized relay P R, and polarized switch P S and sounder S in the positions shown. Should a current of reverse polarity or direction now arrive through $R'$ the arm $a$ would be moved to its right hand contact $c^7$, but as the circuit of the local battery is broken at $h$, the arm $a$ will have no circuit to break on leaving contact $c^6$. On arriving at $c^7$, the circuit of local battery is closed, the path having already been prepared at $h^2$ by the lever of polarized switch P S. Immediately upon the completion of this circuit by arm $a$ and contact $c^7$, polarized relay P R and in turn polarized switch P S are reversed and the local circuit of arm $a$ is broken in advance of its return movement to $c^6$. Therefore there can be no burning or welding at the contacts of the delicate receiver R'. The armature of P S makes contact with plates $h$, $h^2$ by means of a rubbing contact piece $p$, preferably having split or brush ends as shown, so that the contact shall always be sure and of the same resistance. The armature lever of P S controls the local circuit of the sounder S, as shown.

Referring again to Fig. 1, as appears from the foregoing description, it is evident that the intermediate receiver or relay R' may be dispensed with when so delicate an intermediate instrument is not required, and sounder S or final receiver be controlled by intermediate polarized relay $R^2$ as shown in Fig. 1, or the sounder may be controlled directly by intermediate relay R' and polarized relay $R^2$ omitted.

I do not limit the operation and results of sending currents regularly alternating in polarity by regular alternation or manipulation of two keys and the utilization of the neutral or zero position of the movable part of the receiver and its contact arm, representing the open or spacing phase of the final receiver to the design of local or final receiver shown in Fig. 1. The same method of transmission and organization of main receiver may be used to efficiently control apparatus of a different type, such for instance, as a telephone as shown in Fig. 2 in which the telephone may be operated directly by battery current by means of a table of contacts $t$ in which the central or zero contact is left disconnected, so that when the contact arm 4 is moved to either side, it will sound a dot or dash as the case may be, in the telephone, the middle position representing the open or spacing position, the telephone not requiring any electrical assistance in assuming this phase.

Figs. 5 and 6 represent a telephone as a final receiver with a microphone inserted in the local circuit. The vibrating arm controlled by the main receiver simply beats against the microphone contacts whenever it is moved to one side or the other. The arm itself makes no electrical contact and therefore has no welding or sticking to overcome. The impacts of its automatic vibration will be sufficient to give a loud sound in the telephone from which Morse characters may be readily read by the receiving operator. To prevent interference, the microphones $m$, $m'$ are mounted independently of the central zero piece or plate.

Fig. 5 is a side view of the main receiver with microphone arrangement, shown in Fig. 6. In Fig. 7 a telephone receiver is shown, but the microphone contacts are not employed. Instead I use the table of contacts $t$. The outer contacts $c'$, $c^2$ are connected with one side of the telephone, the other side of which is connected through the local battery with the arm 4. The vibratory contact of the arm with the contacts will produce the requisite sound in the telephone.

I claim as my invention—

1. The combination with a line and a transmitter from which successive currents regularly alternating in polarity are sent to transmit either dots or dashes at will, of a main receiver having a movable part normally occupying a zero or central position and capable of being moved in either direction from such position according as the received current is of one polarity or the other, a final receiver open or in spacing condition whenever the said movable part is in its zero position, and contacts and circuit connections whereby the final receiver is operated to indicate a dot or dash as the case may be whenever said movable part is moved to either side of its zero position.

2. The combination of a line and a transmitter from which successive currents regularly alternating in polarity are sent to transmit either dots or dashes at will, of a main receiver having a movable part normally occupying a zero or central position and capable of being moved in either direction therefrom according as the received current is of one polarity or the other, a subsidiary receiving instrument open or representing a space whenever the movable part is in its zero position, contacts or plates one on each side of said zero position upon which said movable part may work, and circuit connections between said instrument and contacts or plates, whereby the instrument is operated to indicate either a dot or dash when the movable part of the main receiver is moved in either direction from its normal or zero position.

3. The combination of a line and a transmitter from which successive currents regularly alternating in polarity are sent to transmit either dots or dashes at will, of a main receiver having a movable part normally occupying a zero or central position and capable of being moved in either direction therefrom according as the received current is of one polarity or the other, a subsidiary receiving instrument open or representing a space whenever the movable part is in its zero position, contacts or plates one on each side of said zero position upon which said movable part may work, circuit connections between said instrument and contacts or plates, and means for imparting fine vibrations to said movable part in a plane transverse to that of its movement whereby the instrument is operated to indicate either a dot or dash when the movable part of the main receiver is moved in either direction from its normal or zero position.

4. The combination with a line and a transmitter from which successive currents regularly alternating in polarity are sent to transmit either dots or dashes at will, of a main receiver having a movable part normally occupying a central or zero position and capable of being moved in either direction therefrom according as the received current is of one polarity or the other, a contact upon which said part bears while in its normal position, and two other contacts one on each side thereof, a split battery having one pole connected to both outer contacts, its other pole to the middle contact and its center with the movable part of the main receiver, and a polarized instrument in the circuit between the middle of the battery and said movable part.

5. The combination with a line and a transmitter from which successive currents regularly alternating in polarity are sent to transmit either dots or dashes at will, of a main receiver having a movable part normally occupying a central or zero position and capable of being moved in either direction therefrom according as the received current is of one polarity or the other, a contact upon which said part bears while in its normal position, and two other contacts one on each side thereof, and a polarized instrument whose circuit is connected with said three contacts and is completed in one direction when the movable part is in its central position and in the opposite direction when it is moved in either direction therefrom and makes contact with one of the side contacts, substantially as set forth.

6. The combination with a line and a transmitter from which successive currents regularly alternating in polarity are sent to transmit either dots or dashes at will, of a main receiver having a movable part normally occupying a central or zero position and capable of being moved in either direction therefrom according as the received current is of one polarity or the other, a contact upon which said part bears while in its normal position, and two other contacts one on each side thereof, a local battery having one pole connected with the two outside contacts and its opposite pole with the central contact and its middle with the movable part of the receiver, a relay having a field magnet and a pivoted or suspended coil in the field thereof included in the local circuit of said battery, and a second relay or instrument whose circuit is controlled by said relay.

7. The combination with a line and a transmitter from which successive currents regularly alternating in polarity are sent to transmit either dots or dashes at will, of a main receiver having a movable part normally occupying a central or zero position and capable of being moved in either direction therefrom according as the received current is of one polarity or the other, a contact upon which said part bears while in its normal position, and two other contacts one on each side thereof, a split battery having one pole connected to both outer contacts, its other pole to the middle contact and its center with the movable part of the main receiver, a polarized instrument in the circuit between the middle of the battery and said movable part, and a final receiver controlled by said polarized instrument.

8. The combination with a line and a transmitter from which successive currents regularly alternating in polarity are sent to transmit either dots or dashes at will, of a main receiver having a movable part normally occupying a central or zero position and capable of being moved in either direction therefrom according as the received current is of one polarity or the other, a contact upon which said part bears when in the zero position and two other contacts one on each side thereof, a split battery having one pole connected to the two outside contacts and the other pole to the middle contact, a relay included in a circuit connection from the middle of the battery to said movable part, and a polarized instrument whose local circuits are controlled at the contacts of said relay, substantially as set forth.

9. The combination with a line and a transmitter from which successive currents regularly alternating in polarity are sent to transmit either dots or dashes at will, of a main receiver having a movable part normally occupying a central or zero position and capable of being moved in either direction therefrom according as the received current is of one polarity or the other, a contact upon which said part bears when in the zero position and two other contacts one on each side thereof, a split battery having one pole connected to the two outside contacts and the other pole to the middle contact, a relay included in a circuit connection from the middle of the battery to said movable part, a polarized instrument whose local circuits are controlled at the contacts of said relay and a final receiver controlled by said polarized instrument, substantially as set forth.

10. The combination with a receiver having a movable part adapted to occupy a central or zero position when no current is upon the line, of a table of contacts, upon which said part works, having a central V-shaped contact or space and a contact on each side thereof whose inner edge is parallel to such V-shape and means for adjusting the table of contacts relatively to the contact end of said movable part.

11. The combination with cable receiver mechanism, of the character described having a field magnet, a swinging coil, a contact arm and a connection from the arm to the coil, of a table of contacts, upon which said arm works, having a central V-shaped contact or space and a contact on each side whose inner edge is parallel with such V-shape, a local instrument whose controlling circuit is connected with said contacts, and means for adjusting the table of contacts relatively to the contact arm.

12. The combination with cable receiver mechanism having a contact arm or device movable in opposite directions from a normal zero position by received impulses of current, of three contacts upon or against which said arm works, and a local instrument whose circuit is controlled at said contacts, the organization being such that when the arm is in the normal position against the middle contact, the local instrument is in open or spacing condition, and when the arm is moved into contact with either of the other contacts the local instrument is actuated to produce a signal.

13. The combination with cable receiver mechanism of the character described, of a contact arm operated from the coil thereof, said arm consisting of an ordinary cable recorder siphon having a conducting wire drawn therein, and local contacts upon which said arm works.

14. The combination with cable receiver mechanism of the character described, of a contact arm operated from the coil thereof by a strand or fiber, and consisting of a relatively rigid support having a fine conducting wire mounted thereon and local contacts upon which said arm works.

15. The combination with the contact arm of an electric instrument and the contact or stop against which it works, of means for imparting to one of said parts fine vibrations parallel with the face of contact to prevent welding or sticking, substantially as set forth.

16. The combination with the contact arm of a telegraphic instrument and the stops or contacts against or upon which it works, of means for imparting to the arm or contacts fine vibrations parallel with the face of contact, substantially as and for the purpose set forth.

17. The combination with the movable contact maker of a telegraphic instrument, of the electrical stops or contacts against which it works, an automatic electric vibrator magnet and armature lever, a straining connection between said lever and the stops or contacts, and a local circuit controlled at said contacts, substantially as set forth.

18. The combination with a part consisting of the movable contact arm of a telegraphic instrument, and a part consisting of two limiting contact stops, arranged in different planes at an angle to the plane of movement of the arm, one on each side of the arm, and between and against which the arm works, of means for imparting to one of said parts fine vibrations to prevent welding or sticking, substantially as set forth.

19. The combination with the movable contact maker of a telegraphic receiving instrument or relay, of contacts against or upon which it bears when moved in either direction, a local circuit from a split battery completed through a branch thereof at either of said contacts, a polarized instrument in the local circuit, a second polarized instrument in a local circuit controlled by the first one, and means for opening one branch of the said split battery circuit whenever the second polarized instrument is actuated, substantially as set forth.

20. The combination with the movable contact maker of a telegraphic receiving instrument or relay, of contacts against or upon which it bears when moved in either direction, a local circuit from a split battery completed through a branch thereof at either of said contacts, a polarized instrument in the local circuit, a second polarized instrument in a local circuit controlled by the first one, and means for opening one branch of the said split battery circuit whenever the second polarized instrument is actuated, and a final receiver whose circuit is also controlled by said second polarized instrument, substantially as set forth.

21. The combination of the movable contact maker of a receiver, the contacts against which it works, two circuits respectively completed at said contacts, a final receiver controlled by said circuits, electro magnetic devices also controlled by said circuits and contacts controlled thereby to open each circuit after its completion and close a corresponding break previously made in the other circuit, substantially as set forth.

22. The combination of the movable contact maker of a receiver, the contacts against which it works, two circuits respectively completed at said contacts, electro magnetic devices controlled by said circuits and contacts controlled thereby to open each circuit after its completion and close a corresponding break previously made in the other circuit, substantially as set forth.

In testimony whereof I have hereunto subscribed my name.

PATRICK B. DELANY.

Witnesses:
FRANK S. OBER,
ALFRED W. VAN ZEE.